Nov. 18, 1952 J. SAMAIN 2,618,386

RECORD CARD SORTING DEVICE

Original Filed July 11, 1945 3 Sheets-Sheet 1

INVENTOR
JACQUES SAMAIN
By
Haseltine, Lake & Co.
AGENTS

RECORD CARD SORTING DEVICE

INVENTOR
JACQUES SAMAIN
By Hazeltine, Lake & Co
AGENTS

RECORD CARD SORTING DEVICE

Original Filed July 11, 1945 3 Sheets-Sheet 3

INVENTOR
JACQUES SAMAIN
By
Haseltine, Lake & Co.
AGENTS

Patented Nov. 18, 1952 2,618,386

UNITED STATES PATENT OFFICE 2,618,386

RECORD CARD SORTING DEVICE

Jacques Samain, Paris, France, assignor to International Business Machines Corporation, New York, N. Y., a corporation of New York Original application July 11, 1945, Serial No. 604,419. Divided and this application January 10, 1950, Serial No. 137,755. In France May 15, 1944

8 Claims. (Cl. 209—111)

This invention relates to means for assorting record cards, sheets and the like of the kind in which the recorded information or notation is represented by differently positioned signs, the records being fed to an analyser comprising a source of radiant energy, such as for instance light, and a device sensitive to light or other radiant energy, the signs on the record cards being analysed and assorted corresponding to the result of the analysis.

This application is a division of the now abandoned parent application of Jacques Samain, Serial No. 604,419, filed July 11, 1945.

In existing prior art sorting devices of a similar type the records carrying several lines of signs are scanned by feeding them in a direction parallel with the lines, to be scanned from one end to the other, or by causing a rotating scanning member to carry them along and wrapping them arounds its circumference for line by line scanning.

Both ways of scanning the records involve the drawback of requiring every record card to be passed through the sorting machine as many times as there are lines of sign combinations exhibited on the card.

In the scanning system according to the present invention the records may exhibit as many parallel lines of sign combinations of different transparency (each line expressing an entire notation), as can be accommodated on the card surface, and these record cards are scanned with their lines extending at right angles to and across the feed track, being fed past a stationary scanning member exhibiting only one line (i. e. a single notation) which also extends across the feed track, this line being a negative, as far as transparency of its signs in concerned, of the line and notation searched for, i. e. being transparent, where the recorded combination is impervious to light, and vice versa. This scanning member, in its preferred form, is a mere card of the size of a record card and is inserted in the machine whenever the notation it carries shall be sorted out.

All the lines on all the record cards pass one after the other above or underneath this one line on the scanning card, and if a record card exhibits for instance twelve lines, each one standing for a different notation, arranged in parallel superposition, all the twelve lines are scanned during one passage of the card past the scanning card. Thus the entire surface of every record card is scanned in a single operation.

Obviously, this system permits of a materially higher speed of all-round operation and of the scanning of a far greater number of recorded notations per unit of time, than the prior art systems mentioned above.

The single-line scanning card with its line extending across the record feed track is an important member of the analyser according to this invention.

The photo-electric scanning device comprises two photocells, a lens system directing light rays across the stationary one-line scanning member onto these cells and an impulse sender, which controls the sorting relay by sending an impulse, whenever a record card traveling past the scanning member causes a cell to be extinguished.

The one-line scanning cards further exhibit, preferably in front of the scanning line, a detection sign. A similar detection sign is arranged in front of every line on every record card. The second photo-cell is positioned in the path of the light rays which pass through the detection sign on the scanning card, and this second cell is so connected in the system as to hinder, when extinguished, the operation of the impulse sender. Thus, when a card shall be sorted out because it bears the notation looked for, the detection sign on the scanning card and the detection sign in front of the notation on the record card must both be transparent.

In the drawings affixed to this specification and forming part thereof an embodiment of my invention is illustrated diagrammatically by way of example.

In the drawings

Fig. 1 is a longitudinal section of an analyser according to this invention, while

Fig. 3 is a wiring diagram showing means for use in scanning the record cards by means of light rays.

Fig. 4 shows by way of example part of a perforated record card adapted to be analysed in an analyser according to this invention, while Fig. 5 illustrates one embodiment of a scanning card adapted and required to be used in the operation of this invention.

Figure 1:
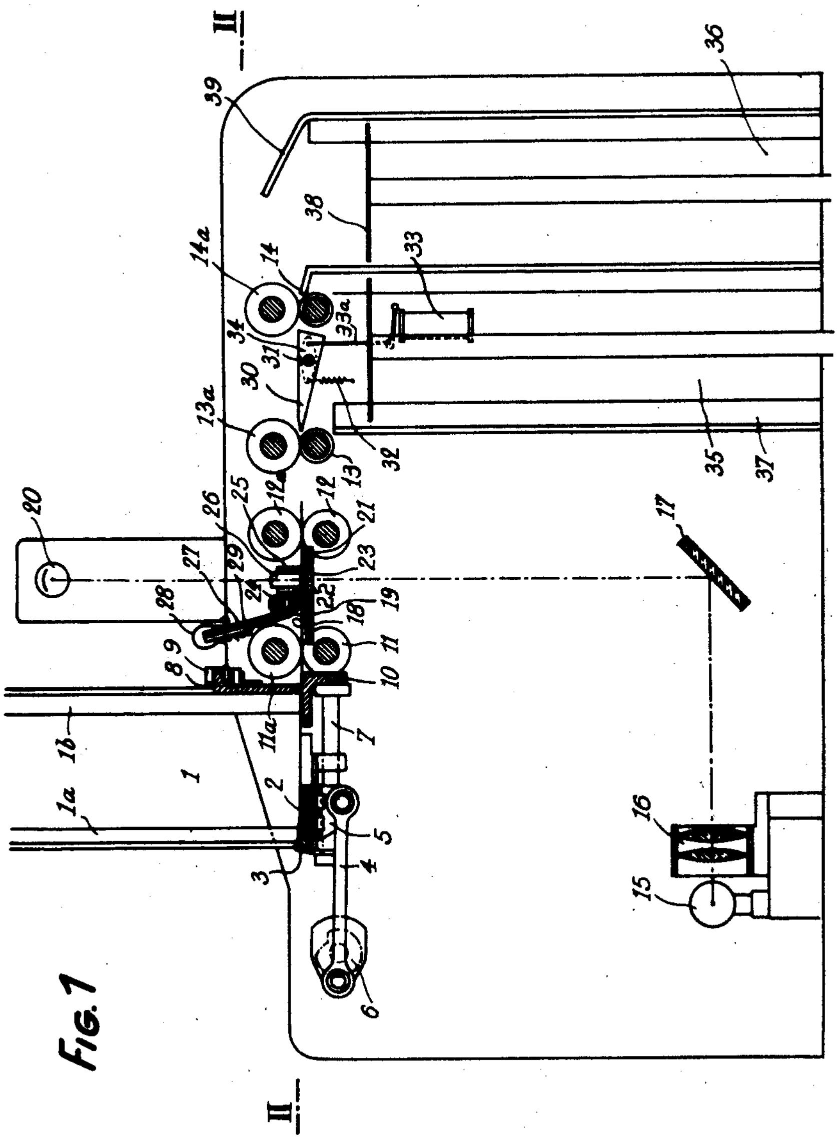
Figure 2:
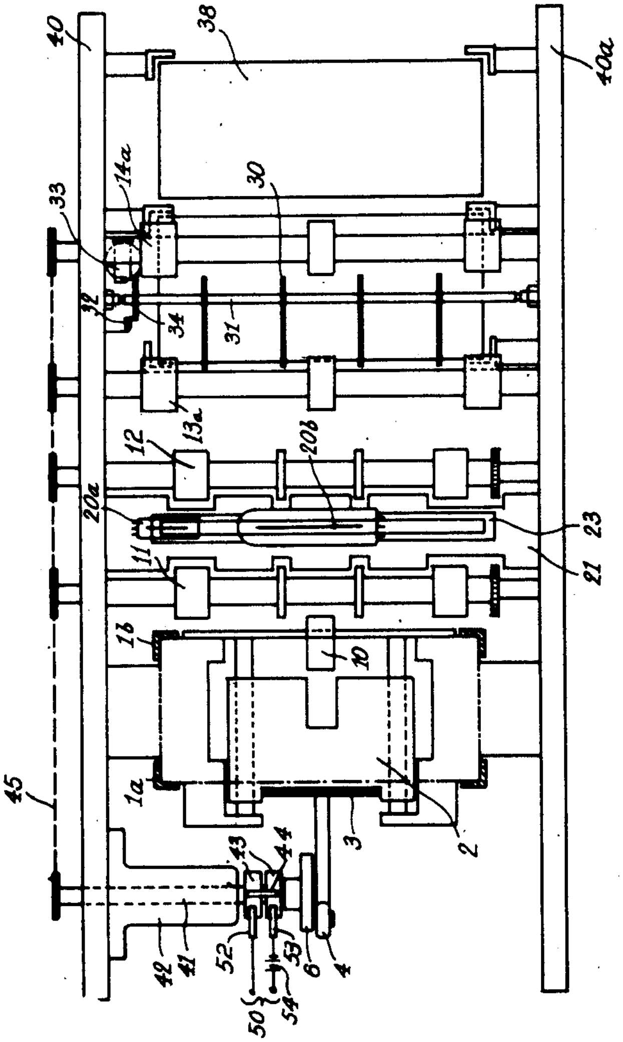
Fig. 2 is a plan view, partly in section on the line II—II in Fig. 1.

Referring to the drawings and first to Figs. 1 and 2, 1 is a receptacle, mainly formed by four angles 1a and 1b, for a stack of record cards to be analysed, 2 is a slide capable of reciprocatory movement at the bottom of the receptacle. It is formed at the rear with an upwardly projecting edge 3 designed to carry along the lowermost card of the stack in the receptacle. The slide is reciprocated by a connecting rod 4 linking a U-shaped sliding shoe 5 fixed to the slide to an eccentric 6 driven by a motor (not shown). A pair of parallel slideways 7, 7 which are fixed to the machine bed guide the slide 2 during the movement thereof.

In front of the card receptacle 1 a stripper 8 adjustable in vertical direction by means of a screw bolt 9 forms, together with the stationary bottom plate 10, a slot which can be set to afford free passage for a single card only. The cards conveyed by the slide are gripped and carried along by a pair of rolls 11, 11a which convey it to a second pair of rolls 12, 12a, which passes it on to a third and eventually also a fourth pair of rolls, 13, 13a and 14, 14a, respectively. All the rolls are driven by the motor in synchronism with the eccentric 6 by means of a chain 45.

Between the first and second pairs of rollers the scanning station is arranged. The bundle of light rays for scanning the cards is projected from a lamp 15, condenser 16 and mirror 17, all mounted underneath the machine bed, upwardly through this station which comprises an optical system guiding the light through the cards conveyed individually, such as 18, which shall be analysed, and a scanning card 19 positioned, during operation of the machine, in the path of the record cards. After passing through this scanning card, the nature and purpose of which will be described farther below, and the record card being analysed, the bundle of light rays illuminates a pair of photo-electric cells 20a and 20b.

The optical system proper consists of a supporting plate 21 formed with a transversal slit 22 of about the same length as a record card (Fig. 4) which may be filled with, or covered by, a transparent lamella 23 of plastic material. Above the supporting plate 21 is mounted a metallic guide piece 24 formed like a quadrant, which grips by means of rounded arm 25 a rectangular glass lens 26. On the quadrant 24 is mounted a deflecting piece 27 which forces the scanning card 19 inserted by hand between it and the top roll 11a of the first pair of rolls to bend and rest in the angle formed between the support 21 and the quadrant 24 and in the gap between the lens 26 and the lamella 23. The rear part of the scanning card 19 is fixed in position by a removable clip 28, while its front edge remains free. Two plates 29 mounted on the piece 27 in spaced relation serve for adjusting the card 19 in scanning position.

Further-on in the path of the record cards which were analysed while passing through the optical station hereabove described, a switch in the form of a trap 30 mounted on a horizontal axle 31 for oscillation against the action of a coil spring 32 is arranged between the third and fourth pairs of conveying rolls. This trap is controlled by an electromagnet 33 forming a relay, whose draw rod 33a acts on one end of a balance lever 34 fixed on the axle 31, the other end being acted upon by the spring 32, so that the relay can lift and drop the point of the trap in accordance with the impulses transmitted to it by the photo-cells as shall be subsequently described. This point is spaced from the middle line of the optical system a little farther than the width of a record card.

Underneath the trap are arranged two receptacles, one 35 for the selected or matched cards, the other 36 for the rejected cards which do not contain any notation or representation of interest for the analysis considered. The receptacles are mainly formed by vertical corner angles 37. A plate 38, on which the non-selected cards are deposited, descends under the weight of the cards accumulating thereon when stopped by a baffle 39.

All the parts hereabove enumerated are arranged between and supported by, side walls 40, 40a of the machine bed (Fig. 2). The axle 41 of the eccentric 6 is supported by a sleeve 42 and carries cam 43 formed of insulating material and having a contact piece 44 mounted thereon which opens and closes the electrical circuit mentioned farther below. The reference numeral 45 (in Fig. 2) indicates the chain which transmits power from the motor (not shown) to the various rotary elements of the machine.

Figures 3, 4, 5, 6:
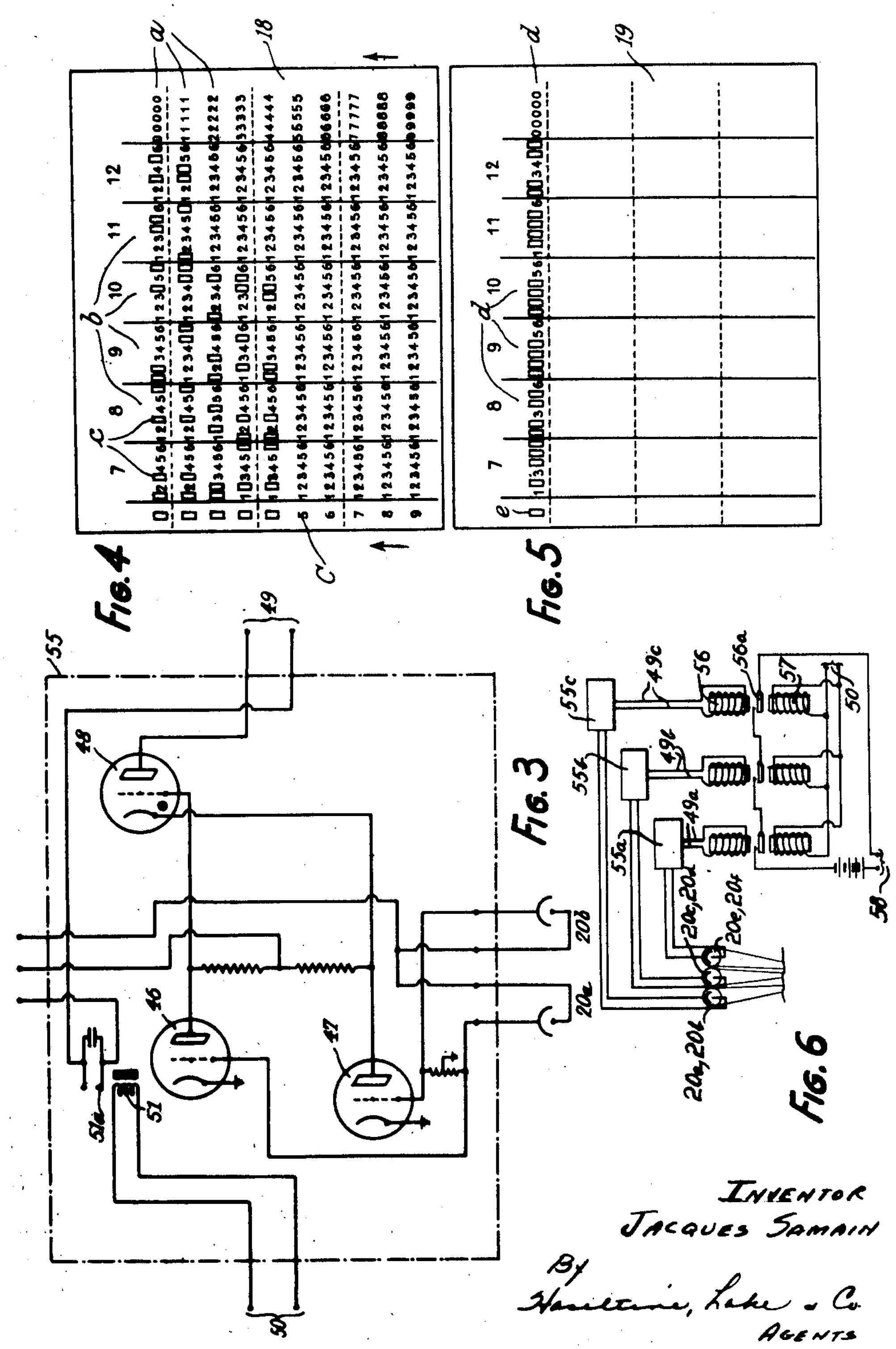

The current impulses transmitting system 55 controlled by the photo-cells or light responsive devices 20a and 20b and including the relay 33 is shown in Fig. 3. It supplies a permanent current to the relay whenever the photo-cell 20b is lighted up, while the cell 20a remains inactive. To this end the current of cell 20b is amplified directly by a triode valve 47. In contrast thereto cell 20a when illuminated blocks the amplification by acting on the grid of a thyratron 48, the cathode of which is fed with current by the valve 47 having the control grid thereof coupled to the photocell 20b. The thyratron 48 feeds a permanent current into the circuit 49 of the relay 33 to energize the relay only when the light responsive devices 20a and 20b are in an "off" and "on" position respectively. The photocell 20b is in an "on" position when a matched condition between the detail card being scanned and the scanning card is detected thereby indicating the presence of a detecting sign or representation. The photocell 20a is in an "off" position when a matched condition between the detail card bearing the sought for data and the complementary punched scanning or exploration card is detected. The anodic circuit of the thyratron may be controlled from the outside by an auxiliary circuit 50 by means of a relay 51 which is excited during each cycle by contact piece 44 controlled by the cam 43 (Fig. 2) periodically coming into engagement with the brushes 44a and 44b causing a circuit to be established for energizing the relay 51. The permanent current supplied to the relay 33 by the thyratron when the exciting conditions of the impulse sender have been established, is thus interrupted automatically during each cycle in the device by the relay 51 which is excited periodically and by means of its contact 51a opens the anodic circuit of the thyratron. The contacts 51a during a card scanning cycle are in a normally closed position. When the relay 51 becomes energized after a card has been scanned, the contacts 51a open thereby breaking the plate voltage supply circuit to the thyratron 48 resulting in the thyratron being made non-conductive.

Before starting to describe the functioning of this device, I will explain the organization of the record cards which are designed to be analysed with its aid, as also the scanning card or cards serving for varying the nature and results of the analyses according to the particular conditions of every individual operation.

The record-bearing cards to be analysed and a stack of which fills the receptacle 1, as shown in Fig. 4 which represents by way of example one such card, have certain signs arranged in a number of parallel lines arranged perpendicularly to the path indicated by arrows on which the cards are designed to travel through the analysing machine. The lines *a* extend in parallel relation and in each line are arranged a number of groups *b* of signs all of which represent one notation. For instance, a card may show 10 superposed lines constituted by 6 columns of superposed groups *b* of 6 digits each. For the purpose of this explanation these digits may be called "expression digits." By means of a special kind of typewriter a certain number of perforations *c*, for instance two, may be made in a group. The position of the perforations made in a group of digits has a particular signification: it indicates a letter of the alphabet.

It is thus possible, in the example here being described, to represent in a line of groups 6 letters and on the entire card 10 notations of 6 letters each.

However, apart from its "expression digits," each line comprises a special digit, which may be called the "detection digit," and this digit (marked C in Fig. 4) will be perforated if a notation is registered in that line. The "detection digits" of a card form a vertical column of their own. Each notation on a card is thus represented, in the example here described, in a line by a perforation of detection and up to 12 perforations of expression.

Before describing an example of an analysing operation, the organization of a scanning or exporation card 19 shall be disclosed. As shown by way of example in Fig. 5, this card bears in a single line the same number of groups *d* of the same number of signs (six) as the lines of the record cards to be analysed, and also a single "detection digit" *e*. Such a scanning card will be prepared, or will be kept in store, for every possible notation to be detected in the record cards passed through the machine, its individuality being based on the perforations made in the line which correspond to the particular notation to be traced. However, the scanning card will not show perforations in those groups which in a record card represent a notation, but will be unperforated in these groups, thus constituting a non-transparent "negative" as regards to positive perforations of the record card. In other words in order to select the detail cards bearing the sought for data, the scanning or exploration card will have the data sought for punched or represented therein in a complementary fashion. It will however contain in the "detecting" column the same perforation as the record card.

Thus the scanning card 19 inserted in the optical scanning system of the machine is the detecting "eye" in the operation of tracing a predetermined notation in the record cards stacked in the container 1 and conveyed one after the other through the optical scanning system. The two light responsive devices or photo-cells 20*a* and 20*b* operate the switching trap 30 (Fig. 1) accordingly and it is the cell 20*b* which, when lighted alone, will activate the relay 33 controlling the trap switch 30 and will so position the trap that the record card drops into the container where the "selected" cards are collected. The photocell 20*b* alone is lighted, whenever the detecting perforation of a card 18 registers with the detecting perforations of the scanning card, while the photocell 20*a* will not be lighted when the group perforations representing the letters of the word sought to be traced are deprived of the passage of light by the corresponding groups of the scanning card which are not perforated, thus forming a "negative" of these perforations.

The scanning card having been inserted with its line of signs in position between the lamella 23 and the lens 26, the bundle of light rays reflected by the mirror 17, in order to impinge upon the photo-cells, has to pass through the slit carrying the lamella 23, a line of the card 18 passing through the system, the partly perforated line of the scanning card 19 and the lens 26. The cell 20*b* receives the light passing through the detection perforations of the scanning card 19 and the traveling card 18, cell 20*a* the light passing through the notation perforations.

Now, the exporation or scanning card forms a converse or complement of the perforations searched for, while it carries or has represented therein, like the detail cards, a detecting perforation. It is therefore easy to understand that each time there passes in front of the lens 26 a line carrying exactly the combination of perforations searched for, the photocell or light responsive device 20*b* will be illuminated, while the photocell 20*a* remains in darkness or in a blackout condition.

As a matter of fact, the perforations of the combinations sought for in the detail cards will be covered by the unpunched portion of the scanning card, and the light will therefore be unable to pass through the zone corresponding to the expression digits so that the photocell 20*a* will not be illuminated.

On the other hand, the detection digit being perforated both in the detail card and in the stationary exploration card, the light will easily pass so as to illuminate a light responsive device 20*b*. With the photocell 20*b* being illuminated at the time the photocell 20*a* is in a blackout condition, the thyratron 48 will be ignited resulting in a circuit being established for the energization of the sorting electromagnet 33 so that the matched card is directed into the receptacle 35 and is separated from the other cards. However, if the combination of perforations in the line being scanned does not correspond exactly to the combination searched for, at least one of these perforations is a necessity above a perforation of the scanning card and consequently light is capable of passing through the zone corresponding to the expression, and the photocell 20*a* is illuminated. With the photocell 20*a* in an illuminated condition, the amplifier tube 46 will operate upon the thyratron 48 in such a fashion as to nullify any effect that the photocell 20*b*, acting through the tube 47, may have on the thyratron, thereby preventing the energization of the sorting electromagnet 33. The card therefore is not selected and is fed into reject receptacle 36.

Consequently, whenever the combination searched for passes through the optical system, but only then, cell 20*b* will be lighted and cell 20*a* will remain dark. This is the condition of operation under which the thyratron impulse sender becomes active and the relay 33 is excited and remains so, until the cam 43 and contact piece 44 have opened the anodic circuit of the tyratron which causes the relay to return to its position of rest.

In order to return the trap 30 to its normal position at the termination of the passage of the card in front of a lens 26, the thyratron 48 is automatically deenergized by an electrical impulse sent periodically into the relay 51 through a circuit 50. This impulse will energize the relay 51 and will open its normally closed contacts 51a to open the output circuit 49 of the thyratron and consequently deenergize the relay 33, which will as a result return the trap 30 to its normal position.

The circuit 50 of the relay 51 comprises a source of current 54 and two brushes 52 and 53 which lie in contact with the two non-conducting cams 43 secured to the axis 41 of the eccentric 6. These two cams are provided with a common conductive contact piece or bridge 44 located in a manner such that it passes underneath the two brushes just at the moment at which the card finishes passing in front of the lens 26. The eccentric 6 through the rod 4 drives the projecting edge or picker 3, as previously alluded to, so that such a synchronism is easy to execute. In this manner each time a card finishes passing in front of the lens 26 the circuit 50 is established, thereby resulting in the relay 51 being energized. The energization of relay 51 causes the contacts 51a to open, thereby breaking the output circuit for the thyratron 48 and causing the same to be deenergized.

It is also possible in accordance with the invention to make use of a scanning device adapted to make selections relating to several numbers at a time. It is sufficient for this purpose to record on the exploration card 19 each of these numbers on a different line to each of these lines thus perforated there will correspond a circuit arrangement similar to that shown in Fig. 3, there being provided for each photocell analyzing the expression digits a corresponding photocell for analyzing the detection digits. This will provide a plurality of complete scanning devices arranged in series. Each line of a card to be selected will be read in succession by the first, second and third devices, but it is possible to design the apparatus in a manner such that matters stand as if each line were read at the same moment by all the scanning devices. Fig. 6 shows such an arrangement wherein are used, for instance, three successive scanning devices having the photocells 20a, 20b, 20c, 20d, 20e and 20f with their corresponding circuit arrangement 55a, 55b and 55c. By this arrangement it is possible to make a variety of selections such as, for instance, selection of all cards carrying any of the numbers X, Y and Z. To this end each output circuit 49a, 49b and 49c corresponding to each pair of photocells will be connected directly to the same sorting electromagnet 33; selection of all the cards carrying simultaneously the numbers X, Y and Z. To this end each output circuit 49a, 49b and 49c is connected with the special relay 56. These relays 56 are not provided with a release spring and their energization leads to the permanent closing of a circuit. Their contacts 56a are in series whereby when they are all energized at any moment of the passage of a card the circuit 58 will close which will cause the operation of the electromagnet 33 in this circuit. The circuit 50 is adapted in this case to return the contacts 56a of the relays 56 to their inoperative position through the medium of a second series of relays such as 57 so as to open a circuit 58 and to deenergize the electromagnet 33.

Various changes may be made in the steps and means hereabove described and shown in the drawings, without departing from the invention or sacrificing the advantages thereof.

I claim:

1. A machine of the class described for comcomparing a plurality of record cards having a detection perforation and groups of perforations, each group forming a pattern representing informative data different from some or all of the remaining groups, a scanning card having a detection perforation positioned to register with said record detection perforation, said scanning card also having perforations arranged in a complementary fashion to at least one of said record group patterns, comprising means for projecting light rays, an electrical circuit, a card sorting relay means coupled to said circuit, means including a light responsive device responsive to the projected light rays passing through said detection perforations of said record and scanning cards, means including a photoelectric cell for sensing the registration of said record card with a group of perforations converse to that present in said scanning card, means for coupling said light responsive device and said photocell to said circuit, said circuit causing said sorting relay to be rendered effective only when said light responsive device and cell detect a matching condition, said light responsive device being shut off and said photocell being exposed simultaneously to said light rays during a matching condition.

2. A machine for selecting documents with reference to at least one predetermined notation comprising a record card holder, a scanning device constituted by an illuminated slot, means for feeding record cards carrying expression and detection signs in succession from said card holder past said scanning device having an exploration card carrying a detecting sign together with expression signs located in the index point positions corresponding to those devoid of same in the cards carrying the expression signs and forming the basis of the selection, a plurality of pairs of light responsive devices constituted each by a light responsive device adapted to analyze the corresponding detection sign and a light responsive device adapted to analyze the corresponding expression signs, current impulse emitters adapted to be fed each by the corresponding pair of light responsive devices and to produce a current flow each time the conditions of energization for said light responsive devices are satisfied for each pair of said light responsive devices, relays corresponding to each pair of light responsive devices adapted to be energized by said current flow and including associated contacts, a sorting electromagnet, circuit means including said relay contacts serially arranged and coupled to said electromagnet, a contacting device adapted to move integrally with said card feeding means and adapted to produce a current impulse whenever the record cards pass through predetermined positions, a series of relays fed by said current impulse adapted to act on the contacts of the first mentioned relays in opposition to the latter, a sorting shutter controlled by said electromagnet and at least two receptacles for selection and rejection into which the cards are transferred according to the position given to said sorting shutter.

3. A machine of the class described for comparing a plurality of record cards having groups of perforations representing informative data different from some or all of the remaining groups, said record cards bearing detection perforations for each line having said data represented therein, with a comparing card having the data sought for represented therein in a pattern complementary to at least one of said record card groups in each data bearing line of said record cards, said comparing card having a detection perforation adapted to register with said record card detection perforation, comprising a plurality of pairs of photoelectric cells, there being one pair for each line to be analyzed where one of said pair of cells is adapted to analyze said cards for the presence of said sought for data while the other of said pair of cells is adapted to analyze said cards for the presence of said detection perforations, a plurality of current impulse emitters, there being one coupled to each pair of corresponding cells, a plurality of relay means including corresponding normally opened contacts, each of said relay means being coupled to the corresponding one of said emitters, a sorting electromagnet, a sorting trap controlled by said magnet for controlling the disposition of said cards with respect to a selection and a rejection receptacle, a circuit arrangement including said contacts serially arranged and coupled to said electromagnet, said emitters causing the corresponding ones of said relay means to become energized each time the conditions of energization of said cells are satisfied, said relay means upon being energized closing said contacts and enabling said electromagnet to be energized by means of said circuit, said electromagnet shifting said shutter whereby the matched record card is deposited in said selection receptacle.

4. A machine of the class described for comparing a plurality of record cards having groups of perforations representing informative data different from some or all of the remaining groups, said record cards bearing detection perforations for each line having said data represented therein, with a comparing card having the data sought for represented therein in a pattern complementary to at least one of said record card groups in each data bearing line of said record cards, said comparing card having a detection perforation adapted to register with said record card detection perforation, comparing means for feeding said record cards past said comparing card, a plurality of pairs of photoelectric cells, there being one pair for each line to be analyzed where one of said pair of cells is adapted to analyze said cards for the presence of said sought for data while the other of said pair of cells is adapted to analyze said cards for the presence of said detection perforations, a plurality of current impulse emitters, there being one coupled to each pair of corresponding cells, a plurality of relay means including corresponding normally opened contacts, each of said relay means being coupled to the corresponding one of said emitters, a sorting electromagnet, a sorting trap controlled by said magnet for controlling the disposition of said cards with respect to a selection and a rejection receptacle, a circuit arrangement including said contacts serially arranged and coupled to said electromagnet, said emitters causing the corresponding ones of said relay means to become energized each time the conditions of energization of said cells are satisfied, said relay means upon being energized closing said contacts and enabling said electromagnet to be energized by means of said circuit, said electromagnet shifting said trap whereby the matched record card is deposited in said selection receptacle, a contact means synchronized with said feeding means and adapted to produce a periodic impulse whenever said cards pass a predetermined position, a series of relays equal in number to said plurality of relay means fed by said periodic impulse and adapted to act on said contacts in a manner opposite to that of said plurality of relays, said circuit arrangement being returned to its normal condition when said series of relays become energized whereby said electromagnet is made ineffective.

5. An electrical circuit arrangement comprising a plurality of pairs of light responsive devices, a first set of relay means, a second set of relay means, contact means commonly associated with said first and second set of relay means, there being one of said first and second set of relays for each pair of said devices, normally ineffective circuit arrangement including said contacts serially arranged, an electromagnet coupled to said circuit, means for energizing said first set of relays whenever only one of said devices for each pair of devices is illuminated, said circuit arrangement being rendered effective upon said relays being energized, said electromagnet being energized when said circuit becomes effective, and means for energizing said second set of relays in order to restore said circuit to its ineffective state.

6. An electrical circuit arrangement comprising a plurality of pairs of light responsive devices, a first and second set of relay means, the number of relays in each of said sets being equal to the number of pairs of said devices, means for coupling said first set of relay means to the corresponding pair of said devices, contact means commonly associated with said first and second set of relay means, said contacts being in a closed position when said first set of relays are energized and in an opened position when said second set of relays are energized, circuit means including said contact means serially arranged, an electromagnet coupled to said circuit means, means for energizing said first set of relay means whenever only one of said devices of each pair is illuminated, said circuit means causing the energization of said electromagnet whenever said first set of relays become energized, means for energizing said second set of relays causing said circuit means to be rendered ineffective and said electromagnet deenergized.

7. An electrical circuit arrangement comprising a plurality of pairs of light responsive devices, a first and second set of relay means, the number of relays in each of said sets being equal to the number of pairs of said devices, means for coupling said first set of relay means to the corresponding pair of said devices, electromagnet means, and means for energizing said electromagnet when said first set of relays are energized and for deenergizing said electromagnet when said second set of relays are energized.

8. A machine for selecting record cards carrying expression and detection signs with reference to at least one predetermined notation with a selecting card carrying a detection sign together with expression signs located in the spots corresponding to those devoid of the same in said cards carrying the expression signs and forming the basis of the comparison, comprising a card holder, means for successively feeding said record cards from said holder, a scanning device constituted by a source of light rays, a first light responsive device adapted to analyze the detecting sign and a second light responsive device adapted to analyze the expression signs in each line of said record cards, corresponding amplifier means coupled to each said responsive device, a current impulse emitter jointly controlled by said amplifier means, a sorting electromagnet coupled to and adapted to be energized by said emitter each time the energization conditions of the light responsive devices are satisfied which correspond to the combination of expression signs searched for passing in front of said scanning device, said first device being exposed and said second device being shut off simultaneously to said light source when one of said record cards favorably compares with said selecting card, a contacting means adapted to move integrally with said card feeding means and to break said coupling arrangement between said emitter and said amplifiers as soon as the card being scanned has finished passing through said scanning device, a sorting shutter controlled by said electromagnet and at least two boxes for selection and for rejection into which the cards are transferred according to the position given to said sorting shutter by said electromagnet.

JACQUES SAMAIN.

REFERENCES CITED

The following references are of record in the file of this patent:

UNITED STATES PATENTS

| Number | Name | Date |
|---|---|---|
| 1,985,035 | Kermode | Dec. 18, 1934 |
| 2,224,646 | Friedman | Dec. 10, 1940 |
| 2,280,948 | Gulliksen | Apr. 28, 1942 |
| 2,358,051 | Broido | Sept. 12, 1944 |
| 2,385,700 | Garlits | Sept. 25, 1945 |
| 2,369,794 | Phinney | Feb. 20, 1945 |
| 2,438,588 | Tolson | Mar. 30, 1948 |